US012804369B2

(12) United States Patent
Yin et al.

(10) Patent No.: US 12,804,369 B2
(45) Date of Patent: Nov. 17, 2026

(54) DEVICE CONTROL METHOD AND APPARATUS

(71) Applicants: QINGDAO HAIER TECHNOLOGY CO., LTD, Shandong (CN); HAIER UPLUS INTELLIGENT TECHNOLOGY (BEIJING) CO., LTD., Beijing (CN); HAIER SMART HOME CO., LTD., Shandong (CN)

(72) Inventors: Deshuai Yin, Shandong (CN); Yunlong Tian, Shandong (CN); Kai Guo, Shandong (CN); Li Niu, Shandong (CN); Changyun Chen, Shandong (CN); Jianfeng Liu, Shandong (CN); Zengbin Bian, Shandong (CN); Xuliang Liang, Shandong (CN); Shuai Yang, Shandong (CN)

(73) Assignees: QINGDAO HAIER TECHNOLOGY CO., LTD;, Shandong (CN); HAIER UPLUS INTELLIGENT TECHNOLOGY (BEIJING) CO., LTD., Beijing (CN); HAIER SMART HOME CO., LTD., Shandong (CN)

( * ) Notice: Subject to any disclaimer, the term of this patent is extended or adjusted under 35 U.S.C. 154(b) by 333 days.

(21) Appl. No.: 18/686,654

(22) PCT Filed: Aug. 5, 2022

(86) PCT No.: PCT/CN2022/110538
§ 371 (c)(1),
(2) Date: Feb. 26, 2024

(87) PCT Pub. No.: WO2023/029881
PCT Pub. Date: Mar. 9, 2023

(65) Prior Publication Data

US 2025/0008310 A1 Jan. 2, 2025

(30) Foreign Application Priority Data

Aug. 31, 2021 (CN) ......................... 202111010426.1

(51) Int. Cl.
*H04W 4/70* (2018.01)
*G06F 8/41* (2018.01)
(Continued)

(52) U.S. Cl.
CPC .............. *H04W 4/70* (2018.02); *G06F 8/427* (2013.01); *G06F 8/65* (2013.01); *G16Y 40/35* (2020.01)

(58) Field of Classification Search
None
See application file for complete search history.

(56) References Cited

U.S. PATENT DOCUMENTS 8,554,702 B2 * 10/2013 Arunapuram .......... G06Q 10/06 703/2
9,686,362 B2 * 6/2017 Choi ...................... H04L 67/51
(Continued)

FOREIGN PATENT DOCUMENTS

CN 102111443 A 6/2011
CN 110855752 A 2/2020
(Continued)

OTHER PUBLICATIONS

H. Cai, L. D. Xu, B. Xu, C. Xie, S. Qin and L. Jiang, "IoT-Based Configurable Information Service Platform for Product Lifecycle Management," in IEEE Transactions on Industrial Informatics, vol. 10, No. 2, pp. 1558-1567, May 2014. (Year: 2014).*
(Continued)

*Primary Examiner* — Melvin H Pollack
(74) *Attorney, Agent, or Firm* — Ballard Spahr LLP

(57) ABSTRACT

The present application provides a device control method and apparatus. The method comprises: uploading a resource
(Continued)

packet of a first device to an Internet of Things platform; receiving a configuration file of the first device sent by the Internet of Things platform, wherein the configuration file is generated by the Internet of Things platform according to second attribute information of the first device when it is determined that the first device accesses the Internet of Things platform according to first attribute information of the first device in the resource package; and parsing the second attribute information of the first device from the configuration file, such that a second device controls the first device according to function information of the first device corresponding to the second attribute information.

16 Claims, 4 Drawing Sheets

(51) Int. Cl.
*G06F 8/65* (2018.01)
*G16Y 40/35* (2020.01)

(56) References Cited

U.S. PATENT DOCUMENTS

| | | | | |
|---|---|---|---|---|
| 10,033,811 | B2 * | 7/2018 | Goodman | H04L 67/1097 |
| 10,116,573 | B2 * | 10/2018 | Britt | H04L 47/2475 |
| 10,715,599 | B2 * | 7/2020 | Hao | H04W 4/70 |
| 11,132,756 | B2 * | 9/2021 | Schuler | H04L 51/18 |
| 11,153,376 | B2 * | 10/2021 | Funk | H04L 67/1068 |
| 11,172,028 | B2 * | 11/2021 | Ko | H04L 67/125 |
| 11,271,806 | B2 * | 3/2022 | Luo | H04W 48/08 |
| 11,283,881 | B1 * | 3/2022 | Nanda | H04L 67/12 |
| 11,343,340 | B2 * | 5/2022 | Bender | H04L 67/12 |
| 11,449,022 | B2 * | 9/2022 | Park | G05B 15/02 |
| 11,461,689 | B2 * | 10/2022 | Petursson | G06V 30/413 |
| 11,469,957 | B2 * | 10/2022 | Riedl | G06F 1/3206 |
| 11,516,311 | B2 * | 11/2022 | Klein | H04L 67/10 |
| 11,521,126 | B2 * | 12/2022 | Braddy | G06N 20/00 |
| 11,662,981 | B2 * | 5/2023 | Han | G06N 3/084 708/551 |
| 11,689,445 | B2 * | 6/2023 | Nagarajan | H04L 45/38 709/238 |
| 11,715,007 | B2 * | 8/2023 | Dalli | G06N 3/042 706/15 |
| 11,722,456 | B2 * | 8/2023 | Kesavan | H04L 61/50 709/245 |
| 11,726,822 | B2 * | 8/2023 | Brebner | G06F 9/5027 703/2 |
| 11,741,131 | B1 * | 8/2023 | Dwivedi | G06F 16/2474 707/758 |
| 11,751,121 | B2 * | 9/2023 | Zhang | H04W 48/06 370/328 |
| 11,774,944 | B2 * | 10/2023 | Cella | G05B 19/4155 700/275 |
| 11,832,106 | B2 * | 11/2023 | Oh | H04W 4/70 |
| 11,836,817 | B2 * | 12/2023 | Hunn | H04L 63/12 |
| 11,853,463 | B1 * | 12/2023 | Hinrichs | H04L 63/0807 |
| 11,892,418 | B1 * | 2/2024 | Featonby | G06F 8/71 |
| 11,915,174 | B2 * | 2/2024 | Moorthy | G06Q 10/06315 |
| 11,916,929 | B1 * | 2/2024 | Thimmegowda | H04L 63/1425 |
| 11,927,925 | B2 * | 3/2024 | Drees | G06N 5/022 |
| 11,936,746 | B2 * | 3/2024 | Song | H04L 63/10 |
| 11,960,844 | B2 * | 4/2024 | Galitsky | G06F 40/253 |
| 12,100,248 | B2 * | 9/2024 | Rupani | G07C 5/008 |
| 12,166,626 | B2 * | 12/2024 | Doshi | H04L 45/036 |
| 12,189,512 | B2 * | 1/2025 | Guim Bernat | H04L 43/08 |
| 12,206,552 | B2 * | 1/2025 | Guim Bernat | G06F 9/5094 |
| 12,346,218 | B2 * | 7/2025 | Brenner | H04L 41/0816 |
| 12,353,203 | B2 * | 7/2025 | Cella | G05B 23/0283 |
| 12,464,041 | B2 * | 11/2025 | Sachs | H04W 12/03 |
| 12,488,310 | B2 * | 12/2025 | Makhija | G06V 30/1914 |
| 12,574,434 | B2 * | 3/2026 | Shelton, IV | H04L 67/10 |
| 2019/0260707 | A1 * | 8/2019 | Kesavan | H04W 4/70 |
| 2020/0177589 | A1 * | 6/2020 | Mangalvedkar | H04W 4/50 |
| 2020/0264858 | A1 | 8/2020 | Li | |
| 2021/0218811 | A1 * | 7/2021 | Kychkin | H04L 67/12 |
| 2022/0027379 | A1 * | 1/2022 | Unterbrunner | G06F 16/254 |
| 2022/0407908 | A1 * | 12/2022 | Cheung | H04N 21/485 |

FOREIGN PATENT DOCUMENTS

| | | | |
|---|---|---|---|
| CN | 111372222 | A | 7/2020 |
| CN | 111901144 | A | 11/2020 |
| CN | 113839992 | A | 12/2021 |

OTHER PUBLICATIONS

M. -O. Pahl and L. Donini, "Giving IoT Services an Identity and Changeable Attributes," 2019 IFIP/IEEE Symposium on Integrated Network and Service Management (IM), Arlington, VA, USA, 2019, pp. 455-461. (Year: 2019).*

A. Musaddiq, Y. B. Zikria, O. Hahm, H. Yu, A. K. Bashir and S. W. Kim, "A Survey on Resource Management in IoT Operating Systems," in IEEE Access, vol. 6, pp. 8459-8482, 2018. (Year: 2018).*

P. Bellavista, A. Corradi, R. Montanari and C. Stefanelli, "Context-aware middleware for resource management in the wireless Internet," in IEEE Transactions on Software Engineering, vol. 29, No. 12, pp. 1086-1099, Dec 2003. (Year: 2003).*

F. Tao, Y. Zuo, L. D. Xu and L. Zhang, "IoT-Based Intelligent Perception and Access of Manufacturing Resource Toward Cloud Manufacturing," in IEEE Transactions on Industrial Informatics, vol. 10, No. 2, pp. 1547-1557, May 2014. (Year: 2014).*

S. Pattar, R. Buyya, K. R. Venugopal, S. S. Iyengar and L. M. Patnaik, "Searching for the IoT Resources: Fundamentals, Requirements, Comprehensive Review, and Future Directions, " in IEEE Communications Surveys & Tutorials, vol. 20, No. 3, pp. 2101-2132, thirdquarter 2018. (Year: 2018).*

International Search Report and Written Opinion for International Application No. PCT/CN2022/110538 mailed Nov. 7, 2022.

* cited by examiner

DEVICE CONTROL METHOD AND APPARATUS

CROSS-REFERENCE TO RELATED APPLICATION

The present application is a U.S. national stage of PCT International Application No. PCT/CN2022/110538, filed on Aug. 5 2022, which claims priority to Chinese Patent Application No. 202111010426.1, filed on Aug. 31, 2021, entitled "Device Control Method and Apparatus", each of which is hereby incorporated by reference in its entirety.

FIELD

The present application relates to the field of device control, and in particular, to device control methods and apparatuses.

BACKGROUND

In the prior art, when home appliances are controlled under the Internet of Things (IoT), different types of controlled devices and control devices need to be accessed to a same IoT platform to interact with each other through the IoT platform. However, when the controlled devices and the control devices are accessed to the same IoT platform, the IoT platform simultaneously plays functions of entering and managing the attribute information of the controlled devices, and functions of querying the attribute information of the controlled devices by the control devices, etc. The resources of the IoT platform are prone to exceed limits due to the large number of devices accessed to the IoT platform, which results in difficulty in accurate control of home appliances.

SUMMARY

The present application provides device control methods and apparatuses which solve a problem of low accuracy of device control due to high resource pressure of the Internet of Things (IoT) platform when controlled devices and control devices are accessed to the same IoT platform in the prior art, relieve the resource pressure on the IoT platform and improve the accuracy of device control.

The present application provides a device control method, performed by a server, including:

uploading a resource pack of a first device to an Internet of Things (IoT) platform;

receiving a configuration file of the first device transmitted from the IoT platform, where the configuration file is generated by the IoT platform based on second attribute information of the first device when the first device accesses the IoT platform, and whether the first device accesses the IoT platform is determined by the IoT platform based on first attribute information of the first device in the resource pack; and parsing the second attribute information of the first device from the configuration file, where the second attribute information is used for controlling, by a second device, the first device based on function information of the first device corresponding to the second attribute information, and the second attribute information is pre-associated with the function information.

The present application further provides a device control method, including:

receiving a resource pack of a first device transmitted from a server;

generating a configuration file of the first device based on second attribute information of the first device when it is determined, based on first attribute information of the first device in the resource pack, that the first device accesses an Internet of Things (IoT) platform; and transmitting the configuration file to the server, where when the server parses the second attribute information of the first device from the configuration file, the second attribute information is used for controlling, by a second device, the first device based on function information of the first device corresponding to the second attribute information, and the second attribute information is pre-associated with the function information.

The present application further provides a device control apparatus, including:

an uploading module for uploading a resource pack of a first device to an Internet of Things (IoT) platform;

a first receiving module for receiving a configuration file of the first device transmitted from the IoT platform, where the configuration file is generated by the IoT platform based on second attribute information of the first device when the first device accesses the IoT platform, and whether the first device accesses the IoT platform is determined by the IoT platform based on first attribute information of the first device in the resource pack; and a parsing module for parsing the second attribute information of the first device from the configuration file, where the second attribute information is used for controlling, by a second device, the first device based on function information of the first device corresponding to the second attribute information, and the second attribute information is pre-associated with the function information.

The present application further provides a device control apparatus, including:

a second receiving module for receiving a resource pack of a first device transmitted from a server;

a configuring module for generating a configuration file of the first device based on the second attribute information of the first device when it is determined, based on first attribute information of the first device in the resource pack, that the first device accesses an Internet of Things (IoT) platform; and a transmitting module for transmitting the configuration file to the server, where when the server parses the second attribute information of the first device from the configuration file, the second attribute information is used for controlling, by a second device, the first device based on function information of the first device corresponding to the second attribute information, and the second attribute information is pre-associated with the function information.

The present application further provides an electronic device, including a memory, a processor, and a computer program stored on the memory and executable on the processor, where the computer program, when executed by the processor, causes the electronic device to perform steps of the device control method mentioned above.

The present application further provides a non-transitory computer-readable storage medium storing a computer program, where the computer program, when executed by a processor, causes the processor to perform steps of the device control method mentioned above.

The present application further provides a computer product storing a computer program, where the computer program, when executed by a processor, causes the processor to perform steps of the device control method mentioned above.

In the device control methods and apparatuses, by accessing the IoT platform to the first device and the server, the IoT platform is only used for entering the second attribute information of the first device and returning the configuration file of the first device based on the resource pack uploaded by the server, and the server performs the function of querying, by the second device, the second attribute information of the first device and the function of managing the second attribute information of the first device, the second device may directly query the second attribute information of the first device on the server, does not need to frequently access the IoT platform, and is not affected by the IoT platform, which effectively alleviates the resource pressure of the IoT platform and effectively improves the accuracy of device control.

BRIEF DESCRIPTION OF THE DRAWINGS

In order to more clearly illustrate the solutions according to the embodiments of the present application and the related art, the accompanying drawings used in the description for the embodiments or the related art are briefly introduced below. It should be noted that the drawings in the following description are only some embodiments of the present application. For those of ordinary skill in the art, other drawings may be obtained according to these drawings without creative effort.

DETAILED DESCRIPTION

In order to illustrate the objects, solutions and advantages of the application, the solutions in present the application will be described clearly and completely below in combination with the drawings in the application. The described embodiments are part of the embodiments of the application, not all of them. All other embodiments obtained by a person of ordinary skill in the art based on the embodiments of the present application without any creative work belong to the scope of the present application.

Figure 1:
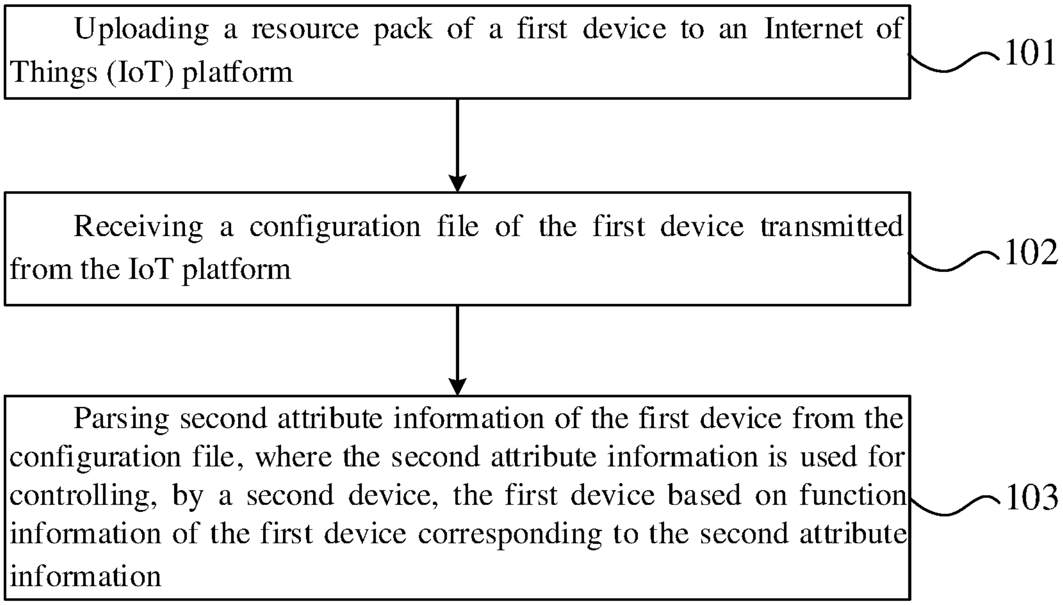
FIG. 1 is a first schematic flow chart of a device control method according to the present application.

A device control method of the present application is described below in conjunction with FIG. 1. The method is performed by a server and includes the following steps:

Step 101, uploading a resource pack of a first device to an Internet of Things (IoT) platform.

The step 101 is performed by the server.

The server may be a server of the home appliance industry itself or a third-party server, which is not specifically limited in the present embodiment.

The resource pack is pre-configured and generated by the server based on an interface that the second device needs to display on a screen, where the resource pack includes first attribute information of the first device. The specific configuration content may be flexibly configured based on actual needs.

The first attribute information includes a number and access status information of the first device, etc., which are not specifically limited in the present embodiment.

The number of the servers may be one or more, which is not specifically limited in the present embodiment.

The server communicates with the IoT platform through the interface provided by the IoT platform.

In an embodiment, when the server needs to obtain second attribute information of the first device accessed to the IoT platform, it needs to first upload the pre-configured resource pack of the first device to the IoT platform through the interface provided by the IoT platform.

Step 102, receiving a configuration file of the first device transmitted from the IoT platform, where the configuration file is generated by the IoT platform based on the second attribute information of the first device when the first device accesses the IoT platform, and whether the first device accesses the IoT platform is determined by the IoT platform based on the first attribute information of the first device in the resource pack.

Figure 2:
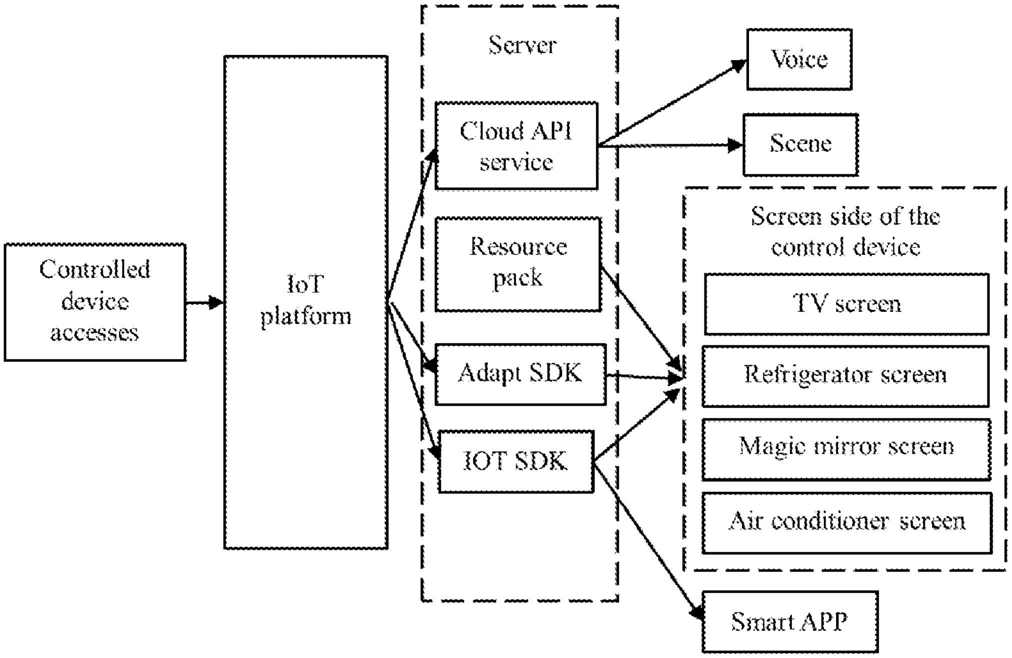
FIG. 2 is a schematic structural diagram of an access between an Internet of Things (IoT) platform and a server in a device control method according to the present application.

As shown in FIG. 2, the first device may be smart devices of various types that need to be controlled, such as refrigerators, televisions, water heaters, etc. The number of first devices may be one or more. The types of the first device and the second device may be the same or different, which is not specifically limited in the present embodiment.

The first device needs to register its attribute information on the IoT platform when it needs to access the IoT platform. The second attribute information includes registered attribute information and operation information of the first device, such as a model name, a model number, a home appliance industry and a manufacturer, and the content of the second attribute information is not specifically limited in the present embodiment. The first attribute information may be included in the second attribute information, or may not be included in the second attribute information, which is not specifically limited in the present embodiment.

In an embodiment, after receiving the resource pack uploaded by the server, the IoT platform determines, based on the first attribute information of the first device in the resource pack, whether the first device accesses the IoT platform.

The first attribute information may include the number of the first device and access information for accessing the IoT platform, which is not specifically limited in the present embodiment.

Whether the first device is accessed to the IoT platform may be determined by matching the number of the first device in the resource pack with the number of the device accessed to the IoT platform, taking a device corresponding to the matched number as the first device and taking the second attribute information of the device corresponding to the matched number as the second attribute information of the first device when matching successes. Whether the first device is accessed to the IoT platform may be determined by determining whether the access status in the access information of the first device in the resource pack is the accessed status. When the access status is the accessed status, search is performed based on an access identifier in the access information of the first device to obtain the second attribute information of the first device, which is not specifically limited in the present embodiment.

When it is determined that the first device accesses the IoT platform, the IoT platform generates the configuration file of the first device based on the second attribute information of the first device and then returns the configuration file of the first device to the server. The configuration file includes the second attribute information and the resource pack, which is not specifically limited in the present embodiment.

The configuration file may be returned in the form of a link or a data packet, which is not specifically limited in the present embodiment.

The configuration file may have a format of a JavaScript Object Notation (JSON) format or extensible markup language (XML) format, etc., which is not specifically limited in the present embodiment.

In the prior art, both the second device and the first device access the IoT platform, which is inconvenient for each home appliance industry to develop functions according to their own needs. In the present embodiment, the IoT platform is only used for entering the attribute information of the first device and interacting with the server, and each home appliance industry may develop corresponding functions on the server according to their own needs without affecting the IoT platform. After the development is completed, various functions may be applied to various home appliance industries, which may effectively improve development efficiency and flexibility.

Compared with traditional mode of accessing the controlled device and the control device to a same IoT platform, the present embodiment accesses the IoT platform to the first device and the server, and the IoT platform is only used for entering the second attribute information of the first device and returning the configuration file of the first device based on the resource pack uploaded by the server. The server performs the function of querying, by each second device, second attribute information of the first device, and the function of managing the second attribute information of the first device. As such, the IoT platform only requires relevant development for the first device and does not require development of querying and accessing functions for each second device and the function of managing attribute information of the first device. The corresponding development for the second device is performed on the server, which reduces the development workload of the IoT platform, and improves the development efficiency of the IoT platform.

Step 103, parsing the second attribute information of the first device from the configuration file, where the second attribute information is used for controlling, by a second device, the first device based on function information of the first device corresponding to the second attribute information, and the second attribute information is pre-associated with the function information.

The second device is a device installed with an application (APP) software for controlling the smart device. In order to facilitate the user to control the first device through the second device, the second device is a device with a screen, including a TV with a screen, a refrigerator, a magic mirror, an air conditioner, a mobile phone, etc., which is not specifically limited in the present embodiment.

The function information includes at least one function of the first device, such as power-on function information and power-off function information.

In an embodiment, after obtaining the configuration file, the server may parse the configuration file to obtain the second attribute information of the first device from the configuration file, and store the second attribute information of the first device. When the second device needs to display the operating status of the first device and control the first device, it needs to query the second attribute information of the first device from the server. After querying the second attribute information of the first device, the second device obtains the function information corresponding to the second attribute information of the first device using the Internet of Things Software Development Kit (IoT SDK).

The query mode may include querying and obtaining the second attribute information of the first device directly from the server, or issuing a query instruction to the server and receiving query results returned by the server, which is not specifically limited in the present embodiment.

The second device may directly control the first device based on the function information corresponding to the second attribute information of the first device. A control interface for controlling the first device may also be generated based on the function information corresponding to the second attribute information of the first device, and the user may call the control interface to control the first device correspondingly. The second device may control the first device, including control in the form of voice, text or specific scene through a cloud application program interface (API).

The device control method in the present embodiment may be applied to mutual control between smart devices in the IoT scenario, and is simple to implement.

In the present embodiment, by accessing the IoT platform to the first device and the server, the IoT platform is only used for entering the second attribute information of the first device and returning the configuration file of the first device based on the resource pack uploaded by the server, and the server performs the function of querying, by the second device, the second attribute information of the first device and the function of managing the second attribute information of the first device, the second device may directly query the second attribute information of the first device on the server, does not need to frequently access the IoT platform, and is not affected by the IoT platform, which effectively alleviates the resource pressure of the IoT platform and effectively improves the accuracy of device control.

Based on the above embodiment, the device control method in the present embodiment further includes: storing the second attribute information in a background of the server; when an instruction for querying the second attribute information transmitted from the second device is received, querying the second attribute information of the first device in the background of the server based on the instruction; and returning the queried second attribute information of the first device to the second device for controlling, by the second device, the first device based on the function information corresponding to the second attribute information.

In an embodiment, after obtaining the second attribute information of the first device, the server stores it in the background of the server to store, classify and manage the second attribute information of the first device.

The second attribute information of the first device may be classified and managed based on the type, the manufacturer and the model of the first device, which is not specifically limited in the present embodiment.

When the second device needs to display the status of the first device and control the first device, a query instruction needs to be transmitted to the server.

The query instruction includes one or more of the type, the manufacturer, the model and the number of the first device, which is not specifically limited in the present embodiment.

After receiving the query instruction, the server queries the second attribute information of the first device from the background of the server based on one or more of the type, manufacturer, the model and the number information of the first device in the query instruction. The queried second attribute information of the first device is then returned to the second device.

After receiving the second attribute information of the first device returned by the server, the second device obtains the function information corresponding to the second attribute information of the first device through the IOT SDK, and controls the first device based on the function information.

In the present embodiment, the server may manage the second attribute information of the first device of different types, manufacturers, models, and number information, and may flexibly set the query instruction and quickly query the second attribute information of the first device based on the flexibly set query instruction.

Based on the above embodiment, in the present embodiment, querying the second attribute information of the first device in the background of the server based on the instruction includes: querying the number of the first device in the instruction from the background of the server; obtaining the second attribute information of the first device corresponding to the number of the first device when the number is queried, where the number is pre-associated with the second attribute information; querying the manufacturer and a subtype of a parent type of the first device in the instruction from the background of the server when the number is not queried; obtaining the second attribute information of the first device corresponding to both the manufacturer and the subtype when both the manufacturer and the subtype are queried, where both the manufacturer and the subtype are pre-associated with the second attribute information; querying the parent type of the first device in the instruction from the background of the server when the subtype is not queried; and obtaining the second attribute information of the first device corresponding to both the manufacturer and the parent type when both the manufacturer and the parent type are queried.

The query instruction includes number information of the first device, the manufacturer of the first device, the parent type, and the subtype of the parent type. A coverage range of smart devices in the parent type is greater than that of smart devices in the subtype. The parent type and the subtypes of the parent type may be flexibly set as needed.

In the present embodiment, multiple groups of parent types and subtypes of the parent type with hierarchical relationships may be set. For example, the coverage range of smart devices in the parent type may include all water heaters, and the coverage range of home appliances in the subtype may include electric water heaters, gas water heaters, etc.

The server hierarchically stores the second attribute information of the first device based on the number and the manufacturer of the first device, multiple groups of parent types with hierarchical relationships, and subtypes of the parent type.

Figure 3:
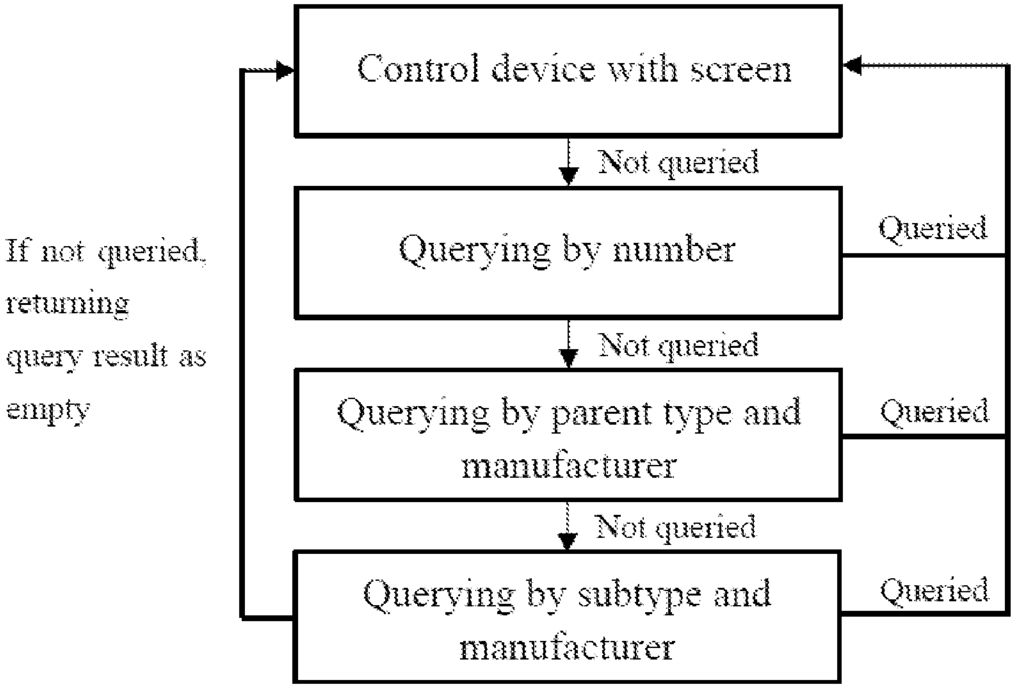
FIG. 3 is a second schematic flow chart of a device control method according to the present application.

As shown in FIG. 3, the number of the first device is queried from the background of the server based on the number of the first device. When the number of the first device is queried, the second attribute information corresponding to the number of the first device is returned to the second device.

The number of the first device is in one-to-one correspondence with the model of the first device. Therefore, the second attribute information of the first device may be accurately obtained based on the number of the first device.

When the number of the first device is not queried, the manufacturer and the subtype of the parent type of the first device are queried from the background of the server based on the manufacturer and the subtype of the parent type of the first device.

When both the manufacturer and the subtype of the parent type of the first device are queried, the second attribute information corresponding to the manufacturer and the subtype of the parent type is returned to the second device. Since the function information corresponding to the subtype of the same parent type is basically the same as that corresponding to the first device of the same manufacturer, the first device may still be normally controlled when only the second attribute information corresponding to the manufacturer and the subtype of the parent type of the first device is queried.

When the subtype of the parent type of the first device is not queried, the manufacturer and the parent type of the first device are queried from the background of the server based on the manufacturer and the parent type of the first device.

When both the manufacturer and the parent type of the first device are queried, the second attribute information corresponding to both the manufacturer and the parent type is returned to the second device. Since the basic function information corresponding to the first device of the same parent type is consistent with that corresponding to the same manufacturer, only some special function information is inconsistent. For example, the start-up and shutdown functions of the water heater are consistent, and there may be some differences in power, heating modes and other special functions.

When the manufacturer or the parent type of the first device is not queried, an empty query is returned to the second device, and the user is prompted so that the user may correct the query instruction.

The prompting mode may be text or voice, which is not specifically limited in the present embodiment.

Therefore, the first device may still be normally controlled when only the attribute information corresponding to the manufacturer and the parent type of the first device is queried.

In the present embodiment, by hierarchically querying the attribute information of the first device, the first device may be accurately controlled even if the attribute information of the first device cannot be accurately obtained, and the device control method has characteristics of high matching accuracy, simple implementation, high query efficiency and good applicability.

Based on the above embodiments, uploading the resource pack of the first device to the IoT platform in the present embodiment includes: when a software version of the second device is updated, uploading a resource pack corresponding to the updated software version to the IoT platform for the IoT platform updating a gray-box testing status in the background of the server when the IoT platform performs a gray-box testing based on the resource pack corresponding to the updated software version, where the software version is pre-associated with the resource pack. Receiving the configuration file of the first device transmitted from the IoT platform includes: when the gray-box testing status in the background is a completed status, receiving an updated configuration file of the first device transmitted from the IoT platform, where the updated configuration file is generated by the IoT platform based on the second attribute information of the first device when it is determined, based on the first attribute information of the first device in the resource pack corresponding to the updated software version, that the first device accesses the IoT platform.

Figure 4:
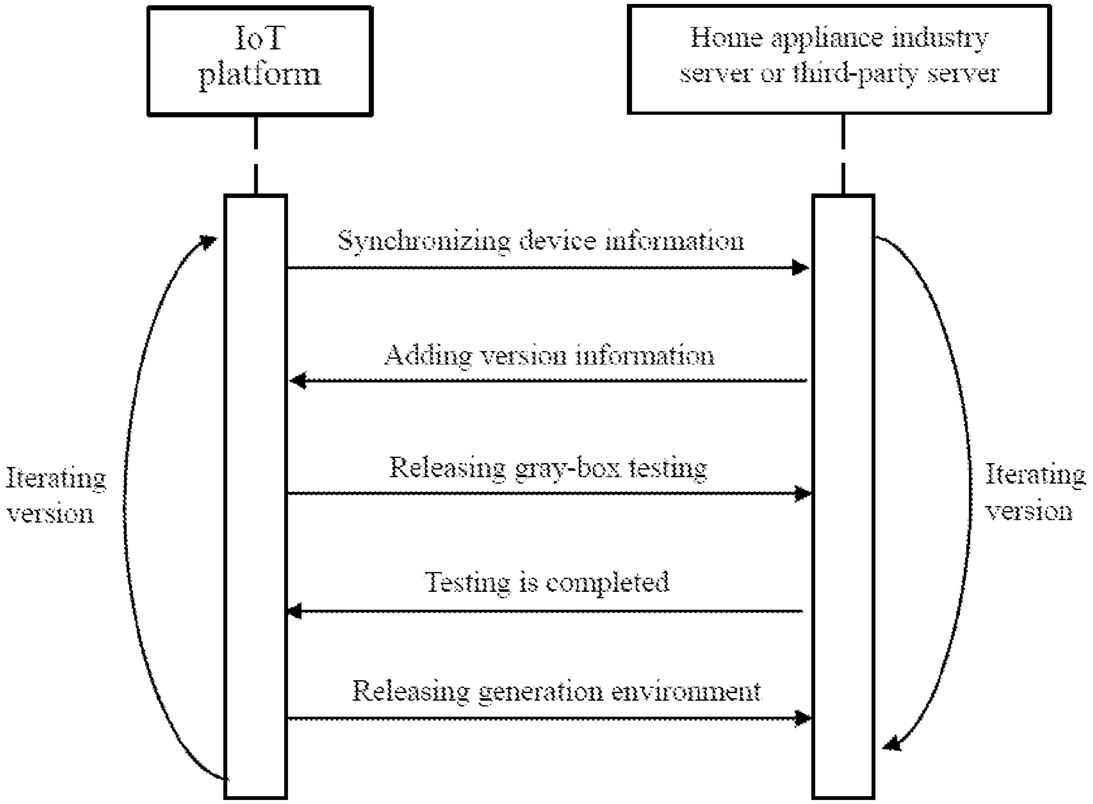
FIG. 4 is a schematic structural diagram of a timing sequence of interaction between an IoT platform and a server in a device control method according to the present application.

As shown in FIG. 4, when it is detected the software version of the second device is updated, the device basic information of the IoT platform is first synchronized. The current version information is added to the device basic information to determine which version of the attribute information the IoT platform operates when the IoT platform releases gray-box testing and the resource pack is uploaded. The device basic information includes the information of the IoT platform itself and the second attribute information of the first device accessed to the IoT platform.

The corresponding resource pack is then matched based on the updated software version, and corresponding version information is added to the resource pack to determine the version information corresponding to the resource pack when the IoT platform performs gray-box testing and transmits configuration files.

In addition, the server also provides relevant interfaces for the IoT platform through which the resource pack corresponding to the updated software version is uploaded to the IoT platform.

After receiving the resource pack corresponding to the updated software version transmitted from the server, the IoT platform starts to perform the gray-box testing and synchronizes the gray-box testing information to the background of the server, to update the gray-box testing status in the background of the server.

The updating manner may include update the gray-box testing status in the background of the server to a testing status when the gray-box testing information indicates that it is testing, that is, updating a flag bit representing the gray-box testing status to 0 when the gray-box testing information indicates that it is testing. The updating manner may include updating the gray-box testing status in the background of the server to a completed status, that is, updating a flag bit representing the gray-box testing status to 1 when the gray-box testing information indicates that the test is completed. The present embodiment does not specifically limit these updating manners.

When the gray-box testing result is in the completed status, the IoT platform synchronizes the gray-box testing status in the background of the server to the completed status. The IoT platform releases a production environment and generates a configuration file of the first device based on the second attribute information of the first device when it is determined, based on first attribute information of the first device in the resource pack corresponding to the updated software version, that the first device accesses the IoT platform.

In addition, when the version of the resource pack is updated, the server also needs to upload the updated resource pack to the IoT platform. The IoT platform performs gray-box testing based on the updated resource pack, and returns the configuration file generated based on the updated resource pack to the server upon completion of the gray-box testing. Furthermore, the server transmits a software adapted to the updated resource pack version to the second device, and the second device may update the software version synchronously.

It should be noted that when the version of the resource pack is updated, the testing steps of the IoT platform are the same as the testing steps of the IoT platform when the software of the second device is updated.

When the resource pack or the software version of the second device is iteratively updated, the corresponding resource pack is uploaded to the IoT platform for the next round of iterative testing and release by the IoT platform.

In the present embodiment, when the resource pack or the software version of the second device is updated iteratively, the configuration file may be updated and iterated accordingly to adapt to various versions of the resource pack and the software of the second device, which effectively ensures the stability and reliability of device control.

Based on the above embodiments, in the present embodiment, receiving the configuration file of the first device transmitted from the IoT platform includes: receiving a modified configuration file of the first device transmitted from the IoT platform when the second attribute information of the first device is modified, where the modified configuration file is generated by the IoT platform based on the modified second attribute information of the first device when it is determined that the first device is accessed to the IoT platform.

In an embodiment, when an operation of modifying the attribute information of the first device registered on the IoT platform is involved, the IoT platform needs to synchronize the modified attribute information to the server, and the IoT platform and the server may implement its own business logic, such as data transmission, data storage, and data display based on the modified attribute information.

In an embodiment, the IoT platform generates a new configuration file based on the modified second attribute information and the pre-configured resource pack, and transmits the new configuration file to the server. When an original configuration file corresponding to the pre-configured resource pack is present in the background of the server, the original configuration file is updated with the new configuration file. When the original configuration file corresponding to the pre-configured resource pack is not present in the background of the server, the new configuration file is stored in the background of the server, such that the second device may correspondingly control the first device based on the function information corresponding to the modified second attribute information to precisely control the first device. In addition, when the second attribute information is modified, the IoT platform does not need to develop new business logic based on the modified second attribute information, only needs to synchronize the modified second attribute information to the server, so that the IoT platform and the server may implement its own business logic based on the modified second attribute information, which effectively alleviates the development workload and resource pressure of the IoT platform.

In the prior art, when the IoT platform accesses any first device or second device, it not only needs to enter the attribute information of the first device, but also needs to develop corresponding business logic for the first device or the second device, which results in large development workload and heavy resource pressure of the IoT platform. However, in the present embodiment, only the business logic corresponding to the first device is developed on the IoT platform, and the responsibility of developing the corresponding business logic for the second device is set on the server, which may effectively alleviate the development workload and resource pressure of the IoT platform, and further ensure the accuracy of device control.

Figure 5:
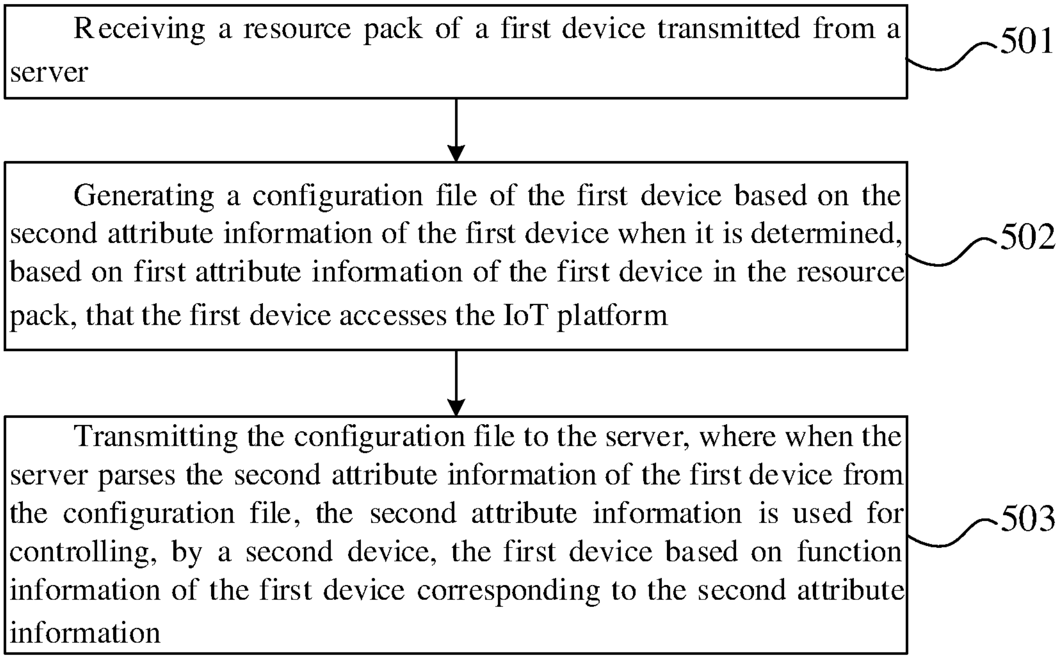
FIG. 5 is a third schematic flow chart of a device control method according to the present application.

As shown in FIG. 5, the present embodiment provides a device control method, performed by an Internet of Things (IoT) platform and includes: step 501, receiving a resource pack of a first device transmitted from a server.

The device control method is performed by the IoT platform.

The IoT platform accesses the first device and the server; and the first device may be smart devices of various types that need to be controlled, such as refrigerators, televisions, water heaters, etc. The number of first devices may be one or more.

The server may be a server of the home appliance industry itself or a third-party server, which is not specifically limited in the present embodiment.

The resource pack is pre-configured and generated by the server based on an interface that the second device needs to display on a screen, and the configuration content of the resource pack may be flexibly configured as needed.

In an embodiment, the first device needs to register its attribute information on the IoT platform when it needs to access the IoT platform. The second attribute information includes registered attribute information and operation information of the first device.

The IoT platform may provide corresponding interfaces for the server and receive the resource pack pre-configured by the server through the corresponding interface when the server needs to obtain attribute information of the first device accessed to the IoT platform.

Step 502, generating a configuration file of the first device based on the second attribute information of the first device when it is determined, based on first attribute information of the first device in the resource pack, that the first device accesses the IoT platform.

In an embodiment, after receiving the resource pack uploaded by the server, the IoT platform determines, based on the first attribute information of the first device in the resource pack, whether the first device accesses the IoT platform.

The first attribute information may include the number of the first device and access information for accessing the IoT platform, which is not specifically limited in the present embodiment.

Whether the first device is accessed to the IoT platform may be determined by matching the number of the first device in the resource pack with the number of the device accessed to the IoT platform, taking a device corresponding to the matched number as the first device and taking the second attribute information of the device corresponding to the matched number as the second attribute information of the first device when the matching successes. Whether the first device is accessed to the IoT platform may be determined by determining whether the access status in the access information of the first device in the resource pack is the accessed status. When the access status is the accessed status, search is performed based on an access identifier in the access information of the first device to obtain the second attribute information of the first device. The present embodiment does not specifically limit this.

When it is determined that the first device accesses the IoT platform, the IoT platform generates the configuration file of the first device based on the second attribute information of the first device and then returns the configuration file of the first device to the server. The configuration file includes the second attribute information and the resource pack, which is not specifically limited in the present embodiment.

The configuration file may be returned in the form of a link or a data packet, which is not specifically limited in the present embodiment.

The format of the configuration file may be JSON format, XML format, etc., which is not specifically limited in the present embodiment.

Step 503, transmitting the configuration file to the server, where when the server parses the second attribute information of the first device from the configuration file, the second attribute information is used for controlling, by a second device, the first device based on function information of the first device corresponding to the second attribute information, and the second attribute information is pre-associated with the function information.

The second device is a device installed with an APP software for controlling the smart device. In order to facilitate the user to control the first device through the second device, the second device is a device with a screen, including a TV with a screen, a refrigerator, a magic mirror, an air conditioner, a mobile phone, etc., which is not specifically limited in the present embodiment.

In an embodiment, after the configuration file is generated, the configuration file of the first device is returned to the server.

In an embodiment, after obtaining the configuration file, the server may parse the configuration file to obtain the second attribute information of the first device from the configuration file, and store the second attribute information of the first device.

When the second device needs to display the status of the first device and control the first device, it needs to query the second attribute information of the first device from the server. After querying the second attribute information of the first device, the second device obtains the function information corresponding to the second attribute information of the first device using the IoT SDK.

The second device may directly control the first device based on the function information corresponding to the second attribute information of the first device. A control interface for controlling the first device may also be generated based on the function information corresponding to the second attribute information of the first device, and the user may call the control interface to control the first device correspondingly. The device control method in the present embodiment may be applied to mutual control between smart devices in the IoT scenario, and is simple to implement.

In the present embodiment, by accessing the IoT platform to the first device and the server, the IoT platform is only used for entering the second attribute information of the first device and returning the configuration file of the first device based on the resource pack uploaded by the server, and the server performs the function of querying, by the second device, the second attribute information of the first device and the function of managing the second attribute information of the first device, the second device may directly query the second attribute information of the first device on the server, does not need to frequently access the IoT platform, and is not affected by the IoT platform, which effectively alleviates the resource pressure of the IoT platform and effectively improves the accuracy of device control.

Based on the above embodiments, in the present embodiment, generating the configuration file of the first device based on the second attribute information of the first device when it is determined, based on first attribute information of the first device in the resource pack, that the first device accesses the IoT platform includes: when the software version of the second device is updated, performing gray-box testing based on the resource pack corresponding to the updated software version uploaded by the server, where the software version is pre-associated with the resource pack; and generating a configuration file of the first device based on the second attribute information of the first device when the gray-box testing status is a completed status, and it is determined, based on the first attribute information of the first device in the resource pack corresponding to the updated software version, that the first device accesses the IoT platform.

In an embodiment, after receiving the resource pack corresponding to the updated software version transmitted from the server, the IoT platform starts to perform the gray-box testing and synchronizes the gray-box testing information to the background of the server to update the gray-box testing status in the background of the server.

When the gray-box testing result is in the completed status, the IoT platform synchronizes the gray-box testing status in the background of the server to the completed status. The IoT platform releases a production environment and generates a configuration file of the first device based on the second attribute information of the first device when it is determined, based on first attribute information of the first device in the resource pack corresponding to the updated software version, that the first device accesses the IoT platform.

In addition, when the version of the resource pack is updated, the server also needs to upload the updated resource pack to the IoT platform. The IoT platform performs gray-box testing based on the updated resource pack, and returns the configuration file generated based on the updated resource pack to the server upon completion of the gray-box testing. Furthermore, the server transmits a software adapted to the updated resource pack version to the second device, and the second device may update the software version synchronously.

It should be noted that when the version of the resource pack is updated, the testing steps of the IoT platform are the same as the testing steps of the IoT platform when the software of the second device is updated.

When the resource pack or the software version of the second device is iteratively updated, the corresponding resource pack is uploaded to the IoT platform for the next round of iterative testing and release by the IoT platform.

In the present embodiment, when the resource pack or the software version of the second device is updated iteratively, the configuration file may be updated and iterated accordingly to adapt to various versions of the resource pack and the software of the second device, which effectively ensures the stability and reliability of device control.

The device control apparatus according to the present application is described below. The device control apparatus described below and the device control method described above may be referenced correspondingly.

Figure 6:
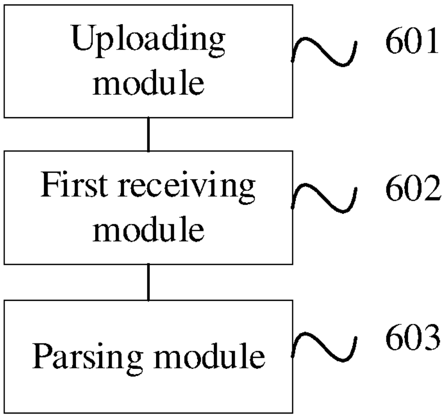
FIG. 6 is a first schematic structural diagram of a device control apparatus according to the present application.

As shown in FIG. 6, the device control apparatus according to the present embodiment includes an uploading module 601, a first receiving module 602 and a parsing module 603.

The uploading module 601 is used for uploading a resource pack of a first device to an Internet of Things (IoT) platform.

In an embodiment, when the server needs to obtain the second attribute information of the first device accessed to the IoT platform, it needs to first upload the pre-configured resource pack of the first device to the IoT platform through the interface provided by the IoT platform.

The first receiving module 602 is used for receiving a configuration file of the first device transmitted from the IoT platform, where the configuration file is generated by the IoT platform based on the second attribute information of the first device when the first device accesses the IoT platform, and whether the first device accesses the IoT platform is determined by the IoT platform based on the first attribute information of the first device in the resource pack.

In an embodiment, after receiving the resource pack uploaded by the server, the IoT platform determines, based on the first attribute information of the first device in the resource pack, whether the first device accesses the IoT platform.

The first attribute information may include the number of the first device and access information for accessing the IoT platform, which is not specifically limited in the present embodiment.

Whether the first device is accessed to the IoT platform may be determined by matching the number of the first device in the resource pack with the number of the device accessed to the IoT platform, taking a device corresponding to the matched number as the first device and taking the second attribute information of the device corresponding to the matched number as the second attribute information of the first device when the matching successes. Whether the first device is accessed to the IoT platform may be determined by determining whether the access status in the access information of the first device in the resource pack is the accessed status. When the access status is the accessed status, search is performed based on an access identifier in the access information of the first device to obtain the second attribute information of the first device, which is not specifically limited in the present embodiment.

When it is determined that the first device accesses the IoT platform, the IoT platform generates the configuration file of the first device based on the second attribute information of the first device and then returns the configuration file of the first device to the server. The configuration file includes the second attribute information and the resource pack, which is not specifically limited in the present embodiment.

The parsing module 603 is used for parsing the second attribute information of the first device from the configuration file, where the second attribute information is used for controlling, by a second device, the first device based on function information of the first device corresponding to the second attribute information, and the second attribute information is pre-associated with the function information.

In an embodiment, after obtaining the configuration file, the server may parse the configuration file to obtain the second attribute information of the first device from the configuration file, and store the second attribute information of the first device.

When the second device needs to display the operating status of the first device and control the first device, it needs to query the second attribute information of the first device from the server. After querying the second attribute information of the first device, the second device needs to obtain the function information corresponding to the second attribute information of the first device using the IOT SDK.

The second device may directly control the first device based on the function information corresponding to the second attribute information of the first device. A control interface for controlling the first device may also be generated based on the function information corresponding to the second attribute information of the first device, and the user may call the control interface to control the first device correspondingly.

In the present embodiment, by accessing the IoT platform to the first device and the server, the IoT platform is only used for entering the second attribute information of the first device and returning the configuration file of the first device based on the resource pack uploaded by the server, and the server performs the function of querying, by the second device, the second attribute information of the first device and the function of managing the second attribute information of the first device, the second device may directly query the second attribute information of the first device on the server, does not need to frequently access the IoT platform, and is not affected by the IoT platform, which effectively alleviates the resource pressure of the IoT platform and effectively improves the accuracy of device control.

Based on the above embodiment, the device control apparatus in the present embodiment further includes a querying module, used for storing the second attribute information in a background of the server; when an instruction for querying the second attribute information transmitted from the second device is received, querying the second attribute information of the first device in the background of the server based on the instruction; and returning the queried second attribute information of the first device to the second device for controlling, by the second device, the first device based on the function information corresponding to the second attribute information.

Based on the above embodiment, the querying module in the present embodiment is further used for querying the number of the first device in the instruction from the background of the server; obtaining the second attribute information of the first device corresponding to the number of the first device when the number is queried, where the number is pre-associated with the second attribute information; querying the manufacturer and a subtype of a parent type of the first device in the instruction from the background of the server when the number is not queried; obtaining the second attribute information of the first device corresponding to both the manufacturer and the subtype when both the manufacturer and the subtype are queried, where both the manufacturer and the subtype are pre-associated with the second attribute information; querying the parent type of the first device in the instruction from the background of the server when the subtype is not queried; and obtaining the second attribute information of the first device corresponding to both the manufacturer and the parent type when both the manufacturer and the parent type are queried.

Based on the above embodiments, the uploading module in the present embodiment is used for uploading, when a software version of the second device is updated, a resource pack corresponding to the updated software version to the IoT platform for the IoT platform to update a gray-box testing status in the background of the server when the IoT platform performs a gray-box testing based on the resource pack corresponding to the updated software version, where the software version is pre-associated with the resource pack. The first receiving module is used for receiving, when the gray-box testing status in the background is a completed status, an updated configuration file of the first device transmitted from the IoT platform, where the updated configuration file is generated by the IoT platform based on the second attribute information of the first device when it is determined, based on the first attribute information of the first device in the resource pack corresponding to the updated software version, that the first device accesses the IoT platform.

Based on the above embodiments, the first receiving module in the present embodiment is further used for receiving a modified configuration file of the first device transmitted from the IoT platform when the second attribute information of the first device is modified, where the modified configuration file is generated by the IoT platform based on the modified second attribute information of the first device when it is determined that the first device is accessed to the IoT platform.

Figure 7:
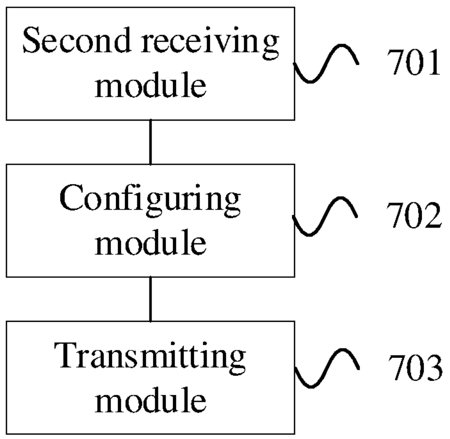
FIG. 7 is a second schematic structural diagram of a device control apparatus according to the present application.

As shown in FIG. 7, the device control apparatus according to the present embodiment includes a second receiving module 701, a configuring module 702 and a transmitting module 703.

The second receiving module 701 is used for receiving a resource pack of a first device transmitted from a server;

the configuring module 702 is used for generating a configuration file of the first device based on the second attribute information of the first device when it is determined, based on first attribute information of the first device in the resource pack, that the first device accesses an Internet of Things (IoT) platform; and the transmitting module 703 is used for transmitting the configuration file to the server, where when the server parses the second attribute information of the first device from the configuration file, the second attribute information is used for controlling, by a second device, the first device based on function information of the first device corresponding to the second attribute information and the second attribute information is pre-associated with the function information.

In the present embodiment, by accessing the IoT platform to the first device and the server, the IoT platform is only used for entering the second attribute information of the first device and returning the configuration file of the first device based on the resource pack uploaded by the server, and the server performs the function of querying, by the second device, the second attribute information of the first device and the function of managing the second attribute information of the first device, the second device may directly query the second attribute information of the first device on the server, does not need to frequently access the IoT platform, and is not affected by the IoT platform, which effectively alleviates the resource pressure of the IoT platform and effectively improves the accuracy of device control.

Based on the above embodiments, a generating module in the present embodiment is used for performing, when the software version of the second device is updated, gray-box testing based on the resource pack corresponding to the updated software version uploaded by the server, where the software version is pre-associated with the resource pack; and generating a configuration file of the first device based on the second attribute information of the first device when the gray-box testing status is a completed status, and it is determined, based on the first attribute information of the first device in the resource pack corresponding to the updated software version, that the first device accesses the IoT platform.

Figure 8:
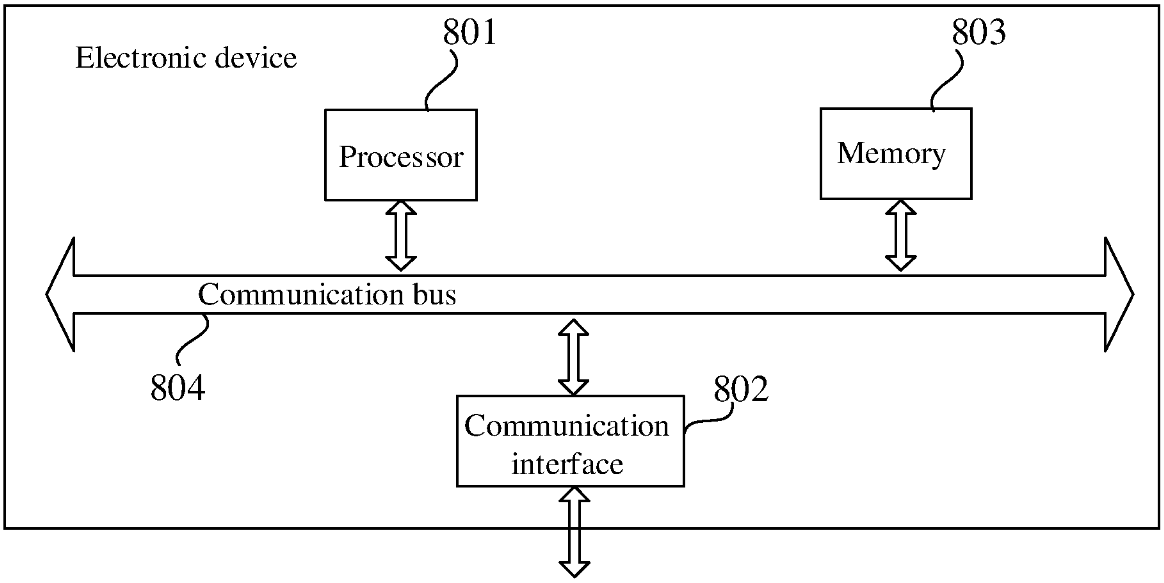
FIG. 8 is a schematic structural diagram of an electronic device according to the present application.

FIG. 8 illustrates a schematic diagram of the physical structure of an electronic device. As shown in FIG. 8, the electronic device may include a processor 801, a communication interface 802, a memory 803, and a communication bus 804. The processor 801, the communication interface 802, and the memory 803 communicate with each other through the communication bus 804. The processor 801 may call logical instructions in the memory 803 to execute a device control method. The device control method includes: uploading a resource pack of a first device to an Internet of Things (IoT) platform; receiving a configuration file of the first device transmitted from the IoT platform, where the configuration file is generated by the IoT platform based on second attribute information of a first device when the first device accesses the IoT platform, and whether the first device accesses the IoT platform is determined by the IoT platform based on first attribute information of the first device in the resource pack; and parsing the second attribute information of the first device from the configuration file, where the second attribute information is used for controlling, by a second device, the first device based on function information of the first device corresponding to the second attribute information, and the second attribute information is pre-associated with the function information.

In addition, the logic instructions in the memory 803 described above may be implemented in the form of a software functional unit and may be stored in a computer readable storage medium when being sold or used as a separate product. Based on such understanding, the solutions of the present application in essence or a part of the solutions that contributes to the prior art, or a part of the solutions, may be embodied in the form of a software product, which is stored in a storage medium, including several instructions to cause a computer device (which may be a personal computer, server, or network device, etc.) to perform all or part of the steps of the methods described in the respective embodiments of the present application. The storage medium described above includes various media that may store program codes such as U disk, mobile hard disk, read-only memory (ROM), random access memory (RAM), magnetic disk, or optical disk.

The present application further provides a computer program product. The computer program product includes a computer program. The computer program may be stored on a non-transitory computer-readable storage medium. The computer program, when executed by a processor, causes the processor to perform the device control method provided by each of the above embodiments. The device control method includes: uploading a resource pack of a first device to an Internet of Things (IoT) platform; receiving a configuration file of the first device transmitted from the IoT platform, where the configuration file is generated by the IoT platform based on second attribute information of a first device when the first device accesses the IoT platform, and whether the first device accesses the IoT platform is determined by the IoT platform based on first attribute information of the first device in the resource pack; and parsing the second attribute information of the first device from the configuration file, where the second attribute information is used for controlling, by a second device, the first device based on function information of the first device corresponding to the second attribute information, and the second attribute information is pre-associated with the function information.

The present application further provides a non-transitory computer-readable storage medium storing a computer program. The computer program, when executed by a processor, causes the processor to perform the device control method provided by each of the above embodiments. The device control method includes: uploading a resource pack of a first device to an Internet of Things (IoT) platform; receiving a configuration file of the first device transmitted from the IoT platform, where the configuration file is generated by the IoT platform based on second attribute information of a first device when the first device accesses the IoT platform, and whether the first device accesses the IoT platform is determined by the IoT platform based on first attribute information of the first device in the resource pack; and parsing the second attribute information of the first device from the configuration file, where the second attribute information is used for controlling, by a second device, the first device based on function information of the first device corresponding to the second attribute information, and the second attribute information is pre-associated with the function information.

The device embodiments described above are merely illustrative, where the units described as separate components may or may not be physically separate, and the components displayed as units may or may not be physical units, that is, may be located at the same place or be distributed to multiple network units. Some or all of the modules may be selected according to actual needs to achieve the purpose of the solution of the present embodiment. Those of ordinary skill in the art may understand and implement the embodiments described above without paying creative labors.

Through the description of the embodiments above, those skilled in the art may clearly understand that the various embodiments may be implemented by means of software and a necessary general hardware platform, and by hardware. Based on such understanding, the solutions of the present application in essence or a part of the solutions that contributes to the prior art, or a part of the solutions, may be embodied in the form of a software product, which may be stored in a storage medium such as ROM/RAM, magnetic discs, optical discs, etc., and includes several instructions to cause a computer device (which may be a personal computer, server, or network device, etc.) to perform the methods described in various embodiments or a part thereof.

Finally, it should be noted that the above embodiments are only used to explain the solutions of the present application, and are not limited thereto; although the present application is described in detail with reference to the foregoing embodiments, it should be understood by those skilled in the art that they may still modify the solutions documented in the foregoing embodiments and make equivalent substitutions to a part of the features; these modifications and substitutions do not make the essence of the corresponding solutions depart from the scope of the solutions of various embodiments of the present application.

What is claimed is:

1. A device control method, comprising:

uploading a resource pack of a first device to an Internet of Things (IoT) platform;

receiving a configuration file of the first device transmitted from the IoT platform, wherein the configuration file is generated by the IoT platform based on second attribute information of the first device when the first device accesses the IoT platform, and whether the first device accesses the IoT platform is determined by the IoT platform based on first attribute information of the first device in the resource pack; and parsing the second attribute information of the first device from the configuration file, wherein the second attribute information is used for controlling, by a second device, the first device based on function information of the first device corresponding to the second attribute information, and the second attribute information is pre-associated with the function information.

2. The device control method of claim 1, further comprising:

storing the second attribute information in a background of a server;

when an instruction for querying the second attribute information transmitted from the second device is received, querying the second attribute information of the first device in the background of the server based on the instruction; and returning the queried second attribute information of the first device to the second device for controlling, by the second device, the first device based on the function information corresponding to the second attribute information.

3. The device control method of claim 2, wherein querying the second attribute information of the first device in the background of the server based on the instruction comprises:

querying a number of the first device in the instruction from the background of the server;

obtaining the second attribute information of the first device corresponding to the number of the first device when the number is queried, wherein the number is pre-associated with the second attribute information;

querying a manufacturer and a subtype of a parent type of the first device in the instruction from the background of the server when the number is not queried;

obtaining the second attribute information of the first device corresponding to both the manufacturer and the subtype when both the manufacturer and the subtype are queried, wherein both the manufacturer and the subtype are pre-associated with the second attribute information;

querying the parent type of the first device in the instruction from the background of the server when the subtype is not queried; and obtaining the second attribute information of the first device corresponding to both the manufacturer and the parent type when both the manufacturer and the parent type are queried.

4. The device control method of claim 1, wherein uploading the resource pack of the first device to the IoT platform comprises:

when a software version of the second device is updated, uploading a resource pack corresponding to the updated software version to the IoT platform for the IoT platform to update a gray-box testing status in the background of the server when the IoT platform performs a gray-box testing based on the resource pack corresponding to the updated software version, wherein the software version is pre-associated with the resource pack; and receiving the configuration file of the first device transmitted from the IoT platform comprises:

when the gray-box testing status in the background is a completed status, receiving an updated configuration file of the first device transmitted from the IoT platform, wherein the updated configuration file is generated by the IoT platform based on the second attribute information of the first device when it is determined, based on the first attribute information of the first device in the resource pack corresponding to the updated software version, that the first device accesses the IoT platform.

5. The device control method of claim 1, wherein receiving the configuration file of the first device transmitted from the IoT platform comprises:

receiving a modified configuration file of the first device transmitted from the IoT platform when the second attribute information of the first device is modified, wherein the modified configuration file is generated by the IoT platform based on a modified second attribute information of the first device when the first device is accessed to the IoT platform.

6. A device control method, comprising:

receiving a resource pack of a first device transmitted from a server;

generating a configuration file of the first device based on second attribute information of the first device when it is determined, based on first attribute information of the first device in the resource pack, that the first device accesses an Internet of Things (IoT) platform; and transmitting the configuration file to the server, wherein when the server parses the second attribute information of the first device from the configuration file, the second attribute information is used for controlling, by a second device, the first device based on function information of the first device corresponding to the second attribute information, and the second attribute information is pre-associated with the function information.

7. The device control method of claim 6, wherein generating the configuration file of the first device based on the second attribute information of the first device when it is determined, based on first attribute information of the first device in the resource pack, that the first device accesses the IoT platform comprises:

when a software version of the second device is updated, performing gray-box testing based on the resource pack corresponding to the updated software version uploaded by the server, wherein the software version is pre-associated with the resource pack; and generating a configuration file of the first device based on the second attribute information of the first device when the gray-box testing status is a completed status, and it is determined, based on the first attribute information of the first device in the resource pack corresponding to the updated software version, that the first device accesses the IoT platform.

8. A device control apparatus, comprising:

an uploading module for uploading a resource pack of a first device to an Internet of Things (IoT) platform;

a first receiving module for receiving a configuration file of the first device transmitted from the IoT platform, wherein the configuration file is generated by the IoT platform based on second attribute information of the first device when the first device accesses the IoT platform, and whether the first device accesses the IoT platform is determined by the IoT platform based on first attribute information of the first device in the resource pack; and a parsing module for parsing the second attribute information of the first device from the configuration file, wherein the second attribute information is used for controlling, by a second device, the first device based on function information of the first device corresponding to the second attribute information, and the second attribute information is pre-associated with the function information.

9. The device control apparatus of claim 8, further comprising a querying module for:

storing the second attribute information in a background of a server;

when an instruction for querying the second attribute information transmitted from the second device is received, querying the second attribute information of the first device in the background of the server based on the instruction; and returning a queried second attribute information of the first device to the second device for controlling, by the second device, the first device based on the function information corresponding to the second attribute information.

10. The device control apparatus of claim 9, wherein querying the second attribute information of the first device in the background of the server based on the instruction comprises:

querying a number of the first device in the instruction from the background of the server;

obtaining the second attribute information of the first device corresponding to the number of the first device when the number is queried, wherein the number is pre-associated with the second attribute information;

querying a manufacturer and a subtype of a parent type of the first device in the instruction from the background of the server when the number is not queried;

obtaining the second attribute information of the first device corresponding to both the manufacturer and the subtype when both the manufacturer and the subtype are queried, wherein both the manufacturer and the subtype are pre-associated with the second attribute information;

querying the parent type of the first device in the instruction from the background of the server when the subtype is not queried; and obtaining the second attribute information of the first device corresponding to both the manufacturer and the parent type when both the manufacturer and the parent type are queried.

11. The device control apparatus of claim 8, wherein uploading the resource pack of the first device to the IoT platform comprises:

when a software version of the second device is updated, uploading a resource pack corresponding to the updated software version to the IoT platform for the IoT platform to update a gray-box testing status in the background of the server when the IoT platform performs a gray-box testing based on the resource pack corresponding to the updated software version, wherein the software version is pre-associated with the resource pack; and receiving the configuration file of the first device transmitted from the IoT platform comprises:

when the gray-box testing status in the background is a completed status, receiving an updated configuration file of the first device transmitted from the IoT platform, wherein the updated configuration file is generated by the IoT platform based on the second attribute information of the first device when it is determined, based on the first attribute information of the first device in the resource pack corresponding to the updated software version, that the first device accesses the IoT platform.

12. The device control apparatus of claim 8, wherein receiving the configuration file of the first device transmitted from the IoT platform comprises:

receiving a modified configuration file of the first device transmitted from the IoT platform when the second attribute information of the first device is modified, wherein the modified configuration file is generated by the IoT platform based on the modified second attribute information of the first device when the first device is accessed to the IoT platform.

13. An electronic device, comprising a memory, a processor, and a computer program stored on the memory and executable on the processor, wherein the computer program, when executed by the processor, causes the electronic device to perform the step of the device control method of claim 1.

14. A non-transitory computer-readable storage medium storing a computer program, wherein the computer program, when executed by a processor, causes the processor to perform the step of the device control method of claim 1.

15. An electronic device, comprising a memory, a processor, and a computer program stored on the memory and executable on the processor, wherein the computer program, when executed by the processor, causes the electronic device to perform the step of the device control method of claim 6.

16. A non-transitory computer-readable storage medium storing a computer program, wherein the computer program, when executed by a processor, causes the processor to perform the step of the device control method of claim 6.

* * * * *